United States Patent
Wang

(10) Patent No.: US 12,067,053 B2
(45) Date of Patent: Aug. 20, 2024

(54) MEDIA FILE PROCESSING METHOD, DEVICE, READABLE MEDIUM, AND ELECTRONIC APPARATUS

(71) Applicant: BEIJING BYTEDANCE NETWORK TECHNOLOGY CO., LTD., Beijing (CN)

(72) Inventor: Yan Wang, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 74 days.

(21) Appl. No.: 17/784,607

(22) PCT Filed: Dec. 9, 2020

(86) PCT No.: PCT/CN2020/135008
§ 371 (c)(1),
(2) Date: Jun. 10, 2022

(87) PCT Pub. No.: WO2021/115346
PCT Pub. Date: Jun. 17, 2021

(65) Prior Publication Data
US 2023/0026921 A1   Jan. 26, 2023

(30) Foreign Application Priority Data
Dec. 13, 2019  (CN) .......................... 201911284557.1

(51) Int. Cl.
G06F 16/00    (2019.01)
G06F 16/71    (2019.01)
(Continued)

(52) U.S. Cl.
CPC ............ *G06F 16/743* (2019.01); *G06F 16/71* (2019.01); *G06F 16/7837* (2019.01)

(58) Field of Classification Search
CPC .... G06F 16/743; G06F 16/71; G06F 16/7837; G06F 16/78; G06F 16/16; G06F 16/17
See application file for complete search history.

(56) References Cited

U.S. PATENT DOCUMENTS

| 2003/0051207 A1* | 3/2003 | Kobayashi ......... H04N 1/00196 |
| | | 715/204 |
| 2005/0105803 A1* | 5/2005 | Ray ..................... G06F 16/5854 |
| | | 382/209 |

(Continued)

FOREIGN PATENT DOCUMENTS

| CN | 107566907 A | 1/2018 |
| CN | 107770614 A | 3/2018 |

(Continued)

OTHER PUBLICATIONS

International Patent Application No. PCT/CN2020/135008; Int'l Written Opinion and Search Report; dated Mar. 10, 2021; 8 pages.

*Primary Examiner* — Syed H Hasan
(74) *Attorney, Agent, or Firm* — BakerHostetler

(57) ABSTRACT

A media file processing method includes: recognizing content features of a target media file, wherein the content features include an image feature and/or a sound feature; determining a target aggregation theme of the target media file according to the recognized content features of the target media file; determining the target media file as media files under the target aggregation theme; and synthesizing the media files under the target aggregation theme in response to a video clip instruction with respect to the target aggregation theme, to obtain a target video corresponding to the target aggregation theme.

12 Claims, 3 Drawing Sheets

(51) Int. Cl.
  *G06F 16/74* (2019.01)
  *G06F 16/783* (2019.01)

(56) References Cited

U.S. PATENT DOCUMENTS

| | | | |
|---|---|---|---|
| 2010/0162172 A1* | 6/2010 | Aroner | G06F 16/44 |
| | | | 707/E17.014 |
| 2011/0129159 A1* | 6/2011 | Cifarelli | G06F 16/51 |
| | | | 382/284 |
| 2015/0106354 A1 | 4/2015 | Cudak et al. | |
| 2018/0025079 A1 | 1/2018 | Xiao et al. | |
| 2020/0235954 A1* | 7/2020 | Shaffer | H04W 64/003 |
| 2022/0108726 A1* | 4/2022 | Li | G11B 27/28 |

FOREIGN PATENT DOCUMENTS

| | | |
|---|---|---|
| CN | 107918656 A | 4/2018 |
| CN | 108235765 A | 6/2018 |
| CN | 109819179 A | 5/2019 |
| CN | 109905782 A | 6/2019 |
| CN | 110347869 A | 10/2019 |
| CN | 110442748 A | 11/2019 |

* cited by examiner

MEDIA FILE PROCESSING METHOD, DEVICE, READABLE MEDIUM, AND ELECTRONIC APPARATUS

This application is the national phase application of PCT International Patent Application No. PCT/CN2020/135008, filed on Dec. 9, 2020, which claims priority of the Chinese patent application entitled "MEDIA FILE PROCESSING METHOD, DEVICE, READABLE MEDIUM, AND ELECTRONIC APPARATUS" and filed with the Patent Office of China on Dec. 13, 2019, with the Application No. 201911284557.1, the disclosure of which is incorporated herein by reference in their entireties.

TECHNICAL FIELD

The present disclosure relates to a field of computer technologies, and more particularly, to a media file processing method, an apparatus, a readable medium, and an electronic device.

BACKGROUND

At present, an automatic aggregation function of mobile phone albums may automatically aggregate media files such as pictures or videos taken in the same time period and in similar places. In the above-described aggregation mode, automatic aggregation is performed based on description information attached to the media files, for example, description information such as shooting time and shooting location that is generated when a picture or a video is shot. However, such an aggregation mode is very monotonous with inflexible aggregation results, and often cannot meet the needs of users. Therefore, a user often needs to manually select media files to manually aggregate the media files, which requires a lot of time and energy of the user and is inefficient.

SUMMARY

An objective of the present disclosure is to provide a media file processing method, an apparatus, a readable medium, and an electronic device, which may automatically aggregate based on content features recognized by media files, with more abundant aggregation dimensions and higher flexibility, and can meet the aggregation needs of users to a greater extent, so as to avoid manual aggregation by the users as much as possible, and to save the users from tedious manual aggregation operations.

In a first aspect, the present disclosure provides a media file processing method, which comprises:
  recognizing content features of a target media file, wherein the content features comprise an image feature and/or a sound feature;
  determining a target aggregation theme of the target media file according to the recognized content features of the target media file;
  determining the target media file as the media files under the target aggregation theme; and
  synthesizing the media files under the target aggregation theme in response to a video clip instruction with respect to the target aggregation theme, to obtain a target video corresponding to the target aggregation theme.

Based on the above-described technical solutions, when aggregating media files, automatic aggregation may be performed based on the content features recognized by the media files, with more abundant aggregation dimensions and higher flexibility, which can meet the aggregation needs of users to a greater extent, so as to avoid manual aggregation by the users as much as possible, and to save the users from tedious manual aggregation operations. In addition, according to automatic aggregation results of the media files, the aggregated media files may also be automatically synthesized into a video to intuitively display the aggregation results and improve user experience.

In one implementation, the image feature comprises an image scene feature and/or an image person feature.

In one implementation, the determining the target aggregation theme of the target media file according to the recognized content features of the target media file, comprises: determining an initial aggregation theme corresponding to the content features of the target media file; and determining the initial aggregation theme as the target aggregation theme of the target media file, in a case where the target media file satisfies a first preset condition corresponding to the initial aggregation theme.

Further, if the target media file satisfies the first preset condition corresponding to the initial aggregation theme, it means that the target media file may be placed in the initial aggregation theme, so the initial aggregation theme may be determined as the target aggregation theme of the target media file.

In one implementation, the target media file satisfies the first preset condition, in a case where the target media file satisfies at least one of cases below: a generation time of the target media file is within a preset time period; a generation location of the target media file is within a preset range; and an image quality of the target media file is better than a first preset image quality.

Further, since the content features may be flexibly defined, the aggregation theme of the target media file may be determined more flexibly with a wider application scope.

In one implementation, the determining the target media file as the media files under the target aggregation theme, comprises: in a case where there is a first file, with a similarity degree between a content feature of the first file and the content feature of the target media file being greater than a first preset similarity threshold, among the media files under the target aggregation theme, and an image quality of the target media file is better than an image quality of the first file, determining the target media file as the media files under the target aggregation theme, and deleting the first file from the media files under the target aggregation theme; and in a case where the first file is not in the media files under the target aggregation theme, determining the target media file as the media files under the target aggregation theme.

Further, it can prevent similar media files from appearing under a same aggregation theme, reduce resource occupation, and ensure better image quality of media files under the aggregation theme as much as possible.

In one implementation, the method further comprises: displaying the media files under the target aggregation theme in an album corresponding to the target aggregation theme.

In one implementation, a cover image of the album corresponding to the target aggregation theme is an image contained in the media files under the target aggregation theme.

In one implementation, a cover image corresponding to the target aggregation theme is determined in a mode below comprises: determining, from the media files under the target aggregation theme, first candidate cover images having matching degrees between content features of the first candidate cover images and the content feature corresponding to the target aggregation theme being greater than a first preset matching degree threshold; sorting the first candidate cover images in a descending order of image quality, and selecting top N images from the first candidate cover images as second candidate cover images; and determining the cover image corresponding to the target aggregation theme from the second candidate cover images, wherein a similarity degree between the cover image corresponding to the target aggregation theme and another cover image is less than a second preset similarity threshold.

Further, the media files under the target aggregation theme are displayed in a form of photo album, which is convenient for the user to view, and is also convenient for the user to select the media files under the target aggregation theme.

In one implementation, the synthesizing the media files under the target aggregation theme, to obtain the target video corresponding to the target aggregation theme, comprises:
    determining candidate media files that satisfy a second preset condition in the media files under the target aggregation theme; and
    performing video synthesis according to the candidate media files to obtain the target video corresponding to the target aggregation theme.

In one implementation, the second preset condition comprises at least one of cases below: an image quality of a second file is better than a second preset image quality; a resolution of the second file is higher than a preset resolution; a matching degree between the content feature of the second file and the content feature corresponding to the target aggregation theme is greater than a second preset matching degree threshold; and the second file is of the media files under the target aggregation theme.

Further, during video synthesis, the media files under the target aggregation theme are screened to a certain extent to form a target video corresponding to the target aggregation theme, which can save the user a manual screening operation and can improve quality of the target video.

In a second aspect, the present provides a media file processing apparatus, which comprises:
    a recognizing module, configured to recognize content features of a target media file;
    a first determining module, configured to determine a target aggregation theme of the target media file according to the recognized content features of the target media file;
    a second determining module, configured to determine the target media file as the media files under the target aggregation theme; and
    a video synthesizing module, configured to synthesize the media files under the target aggregation theme in response to a video clip instruction with respect to the target aggregation theme, to obtain a target video corresponding to the target aggregation theme.

In a third aspect, the present provides a computer-readable medium, on which a computer program is stored, wherein, when executed by a processing apparatus, the computer program implements the steps of the method according to the first aspect.

In a fourth aspect, the present provides an electronic device, which comprises:
    a storage apparatus, on which a computer program is stored; and
    a processing apparatus, configured to execute the computer program in the storage apparatus, to implement the steps of the method according to the first aspect.

In a fifth aspect, the present provides a computer program, the computer program causes the computer to execute the method according to the first aspect.

Combining the above-described technical solutions, when aggregating media files, automatic aggregation may be performed based on the content features recognized by the media files, with more abundant aggregation dimensions and higher flexibility, which can meet the aggregation needs of users to a greater extent, so as to avoid manual aggregation by the users as much as possible, and to save the users from tedious manual aggregation operations. In addition, according to automatic aggregation results of the media files, the aggregated media files may also be automatically synthesized into a video to intuitively display the aggregation results and improve user experience. If the target media file satisfies a first preset condition corresponding to the initial aggregation theme, it means that the target media file may be placed in the initial aggregation theme, so the initial aggregation theme may be determined as the target aggregation theme of the target media file. Since the content features may be flexibly defined, the aggregation theme of the target media file may be determined more flexibly with a wider application scope. It can prevent similar media files from appearing under a same aggregation theme, reduce resource occupation, and ensure better image quality of media files under the aggregation theme as much as possible. The media files under the target aggregation theme are displayed in a form of photo album, which is convenient for the user to view, and is also convenient for the user to select the media files under the target aggregation theme. During video synthesis, the media files under the target aggregation theme are screened to a certain extent to form a target video corresponding to the target aggregation theme, which can save the user a manual screening operation and can improve quality of the target video.

BRIEF DESCRIPTION OF THE DRAWINGS

The above and other features, advantages and aspects of various embodiments of the present disclosure will become more apparent when taken in conjunction with the accompanying drawings and with reference to the following detailed implements. Throughout the drawings, the same or similar reference numbers refer to the same or similar elements. It should be understood that the drawings are schematic and that the components and elements are not necessarily drawn to scale. In the accompanying drawings.

DETAILED DESCRIPTION

Figure 1:
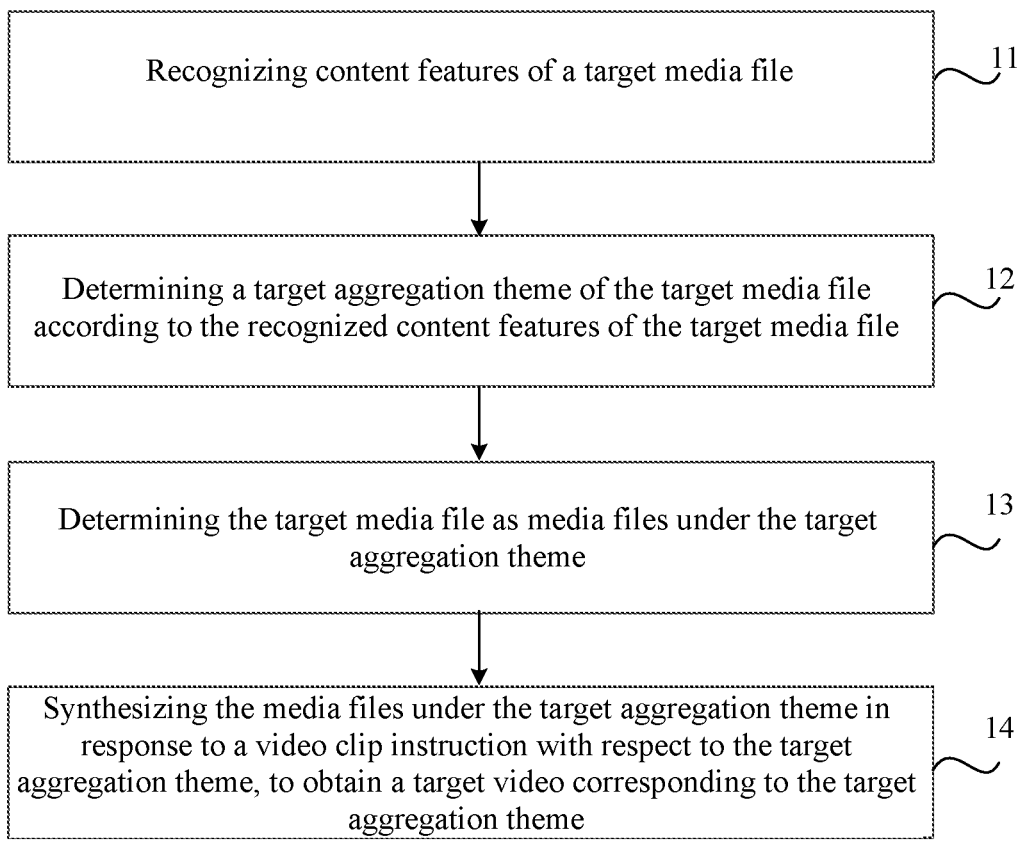
FIG. 1 is a flow chart of a media file processing method provided by an implementation mode of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes, and are not intended to limit the protection scope of the present disclosure.

It should be understood that the various steps described in the method embodiments of the present disclosure may be performed in different orders and/or in parallel. Furthermore, method embodiments may include additional steps and/or omit performing the illustrated steps. The scope of the present disclosure is not limited in this regard.

As used herein, the term "including" and variations thereof are open-ended inclusions, i.e., "including but not limited to". The term "based on" is "based at least in part on"; The term "one embodiment" means "at least one embodiment"; the term "another embodiment" means "at least one additional embodiment"; the term "some embodiments" means "at least some embodiments". Relevant definitions of other terms will be given in the description below.

It should be noted that concepts such as "first", "second", etc. mentioned in the present disclosure are only used to distinguish different devices, modules or units, and are not used to limit the order of functions performed by these devices, modules or units or interdependence relationship.

It should be noted that the modifications of "a" and "a plurality" mentioned in the present disclosure are illustrative rather than restrictive, and those skilled in the art should understand that unless the context clearly indicates otherwise, they should be understood as "one or more".

The names of messages or information exchanged between multiple devices in the embodiments of the present disclosure are only for illustrative purposes, and are not intended to limit the scope of these messages or information.

FIG. 1 is a flow chart of a media file processing method provided by an implementation mode of the present disclosure. The method according to the present disclosure may be applied to devices such as a client (e.g., a mobile phone), a server, etc. The media files involved in the solution may be image files or video files. As shown in FIG. 1, the method may include steps of:

Step 11: recognizing content features of a target media file.

The target media file is one of the to-be-processed media files; in practical application, each to-be-processed media file may be regarded as the target media file; and the target media file may be processed according to the method provided by the present disclosure.

The content features of the target media file are recognition results obtained by performing content recognition on the target media file, so the content features of the target media file may reflect the content of the target media file. The content features may be, for example, baby, beach, building, car, cartoon, cat, dog, flower, food, group photo, mountain, indoor scene, lake, sea, night scene, selfie, sky, sculpture, street scene, sunset, text, tree, etc., which may be customized as needed.

The content features of the target media file include an image feature and/or a sound feature. If the target media file is an image file, the content feature of the target media file is an image feature. For example, if the target media file is an image containing a swimming pool, the image feature of the target media file is a swimming pool. If the target media file is a video file, the content feature of the target media file may be an image feature, may also be a sound feature, or may also be an image feature and a sound feature. For example, if the target media file is a night scene video and the audio of the night scene video contains a human voice, then the image feature of the target media file is a scenery and the sound feature is a person.

Step 12: determining a target aggregation theme of the target media file according to the recognized content features of the target media file.

For example, an aggregation theme that matches the content features may be determined as the target aggregation theme of the target media file. Each aggregation theme may correspond to one or more content features, and may be set freely. In addition, which one or several content features the aggregation theme corresponds to may be customized by the user. For example, the aggregation theme may be a "selfie collection", and correspondingly, the content features of the aggregation theme correspond to selfies. For another example, the aggregation theme may be "best memories", and correspondingly, the content features of the aggregation theme may correspond to baby, beach, building, car, cartoon, cat, dog, flower, food, group photo, mountain, indoor scene, lake, sea, night scene, selfie, sky, sculpture, street scene, sunset, text, and tree.

The above-described matching the content features may be that the content features of the target media file contain all of the content features corresponding to the aggregation theme, or may also be that the content features of the target media file contain some of the content features corresponding to the aggregation theme. For example, assuming that the content features of the target media file contain all of the content features corresponding to the aggregation theme, it is determined that the content features of the two match each other, then, if a certain aggregation theme corresponds to outdoor scene, then, if the content feature of the target media file is outdoor scene, it may be determined that the content features of the two match each other, so the aggregation theme may be determined as the target aggregation theme of the target media file. For another example, assuming that it is determined that the content features of the two match each other when the content features of the target media file contain some of the content features corresponding to the aggregation theme (e.g., it is determined that the content features of the two match each other as long as the content features of the target media file contain one of the content features corresponding to the aggregation theme), then, if a certain aggregation theme corresponds to selfie, sky, sculpture, street scene, sunset, then if the content feature of the target media file is selfie, it may be determined that the content features of the two match each other, so the aggregation theme may be determined as the target aggregation theme of the target media file. For another example, assuming that it is determined that the content features of the two match each other only when the content features of the target media file contain all of the content features corresponding to the aggregation theme, then, if a certain aggregation theme corresponds to outdoor scene and beach, then if the content features of the target media file only contain outdoor scene and do not contain beach, it may be determined that the content features of the two do not match each other, so the aggregation theme is not the target aggregation theme of the target media file.

Essentially, one aggregation theme corresponds to a collection of one or more media files, each aggregation theme may correspond to a plurality of media files (these media files may be referred to as media files under the aggregation theme), and content features of the media files under each aggregation theme match the content features of the aggregation theme, that is, media files under the same aggregation theme have similar content features. In addition, a target media file may have one or more target aggregation themes.

Step 13: determining the target media file as a media file under the target aggregation theme.

Step 14: synthesizing the media files under the target aggregation theme in response to a video clip instruction with respect to the target aggregation theme, to obtain a target video corresponding to the target aggregation theme.

In a possible embodiment, the video clip instruction may be issued by the user through a client; the client where the user is located may display a trigger button for generating the video clip instruction; and if the user clicks the trigger button, the video clip instruction may be generated. For example, each target aggregation theme may correspond to one trigger button; and when the user clicks the trigger button corresponding to the target aggregation theme, the client generates a video clip instruction with respect to the target aggregation theme.

In another possible implementation mode, the video clip instruction may also be automatically generated. For example, video clip instruction may be generated if certain conditions are satisfied. For example, if the number of the media files under the target aggregation theme reaches a preset value, a video clip instruction with respect to the target aggregation theme is generated. For another example, if a certain time point is reached, a video clip instruction with respect to the target aggregation theme is generated.

In response to the video clip instruction with respect to the target aggregation theme, some or all of the media files under the target aggregation theme may be synthesized to obtain the target video corresponding to the target aggregation theme.

Based on the methods from step 11 to step 14, with respect to the target media file, firstly, the content features of the target media file are recognized, that is, the content contained in the target media file is recognized; then the aggregation theme (i.e., the target aggregation theme) to which the target media file belongs is found for the target media file according to the recognized content features; and the target media file is aggregated under the target aggregation theme. Therefore, media files with similar content features may be aggregated together, that is, aggregated into the same aggregation theme; and the aggregation of the media files is implemented based on the content features. Thereafter, if there is a video clip requirement for the media files under the target aggregation theme, in response to the video clip instruction with respect to the target aggregation theme, the media files under the target aggregation theme are synthesized to obtain the target video corresponding to the target aggregation theme, that is, the media files under the same aggregation theme are synthesized into one video.

Through the above-described technical solution, the content feature of the target media file is recognized; the target aggregation theme of the target media file is determined according to the recognized content feature; the target media file is determined as a media file under the target aggregation theme; and then in response to the video clip instruction with respect to the target aggregation theme, the media files under the target aggregation theme are synthesized to obtain the target video corresponding to the target aggregation theme. The content features of the target media file include an image feature and/or a sound feature. In this way, when aggregating the media files, automatic aggregation may be performed based on the image feature and/or the sound feature recognized by the media files, with more abundant aggregation dimensions and higher flexibility, which can meet the aggregation needs of users to a greater extent, so as to avoid manual aggregation by the users as much as possible, and to save the users from tedious manual aggregation operations. In addition, according to the automatic aggregation results of the media files, the aggregated media files may also be automatically synthesized to intuitively display the aggregation results and improve the user experience.

In order to make those skilled in the art better understand the technical solutions provided by the embodiments of the present disclosure, the corresponding steps or application scenarios above are described in detail below.

Firstly, the recognizing the content features of the target media file in step 11 will be described in detail.

As described above, the content features include image features and/or sound features. The image features may include an image scene feature and/or an image person feature. The image scene feature reflects content of scene in the image, for example, location of the scene (e.g., indoors, outdoors, seaside, beach, etc.), object in the scene (e.g., swimming pool, cat, dog, flower, tree, car, food, building, etc.), type of the scene (e.g., street, night scene, sunset), etc. The image person feature reflects content of person in the image, for example, type of the person (e.g., infant, elderly, etc.), identity of the person, and shooting mode of the person (e.g., selfie, group photo), etc. The sound features reflect content associated with audio, for example, scene corresponding to sound (e.g., seaside, indoors, outdoors, car horn, etc.), originator of sound (e.g., baby, owner, cat, and dog), etc.

In a possible embodiment, the content feature may be embodied in a form of tags, that is, different tags are used to reflect different content features. For example, if the content feature is a beach, a "beach" tag may be defined to represent the content feature. For example, the image scene feature, the image person feature, and the sound feature may be sequentially reflected in a scene-type tag, a person-type tag, and a sound-type tag respectively.

In a possible implementation mode, if the target media file contains image content (e.g., the target media file is an image-type media file, or, the target media file is a video-type media file), image recognition may be performed on the target media file to obtain an image scene feature and/or an image person feature corresponding to the target media file.

The image recognition may be performed by using a person recognition algorithm or a scene recognition algorithm, for example, a face recognition algorithm is used to recognize the image person feature, and a scene recognition algorithm is used to recognize the image scene feature.

For example, if the target media file is an image-type media file, an image-specific scene recognition algorithm and/or an image-specific person recognition algorithm may be used.

The image-specific scene recognition algorithm takes a single image as input and takes the image scene features as output. In a pre-training algorithm process, a plurality of groups of first training data may be obtained firstly; each group of first training data includes a first historical image and an image scene feature corresponding to the first historical image; then the first historical image is taken as input data, the image scene feature corresponding to the first historical image is taken as output data; and a machine learning algorithm is trained to obtain an image-specific scene recognition algorithm. After inputting the single image into the above-described image-specific scene recognition algorithm, a matching degree between the content feature of the input image and the respective image scene features, that is, a confidence of the input image that corresponds to the respective image scene features, may be determined through the calculation within the algorithm. The higher the matching degree between the content feature of the input image and a certain image scene feature, the higher the confidence corresponding to the image scene feature, and the closer the content feature of the input image is to the image scene feature. In a process of training the algorithm, an output mode of the algorithm may be set as, for example, only outputting an image scene feature corresponding to the highest confidence, or outputting image scene features corresponding to the top few confidences according to a descending order of confidences. Therefore, after inputting the target media file into the image-specific scene recognition algorithm, the image scene feature (which may be one or more, depending on preset algorithm output) output by the algorithm may be obtained, which is the image scene feature of the target media file; meanwhile, the confidence of the target media file that corresponds to the image scene feature thereof may be obtained through the algorithm used.

The image-specific person recognition algorithm takes a single image as input and takes the image person feature as output. In a pre-training algorithm process, a plurality of groups of second training data may be obtained firstly; each group of second training data includes a second historical image and an image person feature corresponding to the second historical image; then the second historical image is taken as input data, the image person feature corresponding to the second historical image is taken as output data; and a machine learning algorithm is trained to obtain an image-specific person recognition algorithm. After inputting the single image into the above-described image-specific person recognition algorithm, a matching degree between the content feature of the input image and the respective image person features, that is, a confidence of the input image that corresponds to the respective image person features, may be determined through the calculation within the algorithm. The higher the matching degree between the content feature of the input image and a certain image person feature, the higher the confidence corresponding to the image person feature, and the closer the content feature of the input image is to the image person feature. In a process of training the algorithm, an output mode of the algorithm may be set as, for example, only outputting an image person feature corresponding to the highest confidence, or outputting image person features corresponding to the top few confidences according to a descending order of confidences. Therefore, after inputting the target media file into the image-specific person recognition algorithm, the image person feature (which may be one or more, depending on preset algorithm output) output by the algorithm may be obtained, which is the image person feature of the target media file; meanwhile, the confidence of the target media file that corresponds to the image person feature thereof may be obtained through the algorithm used.

For another example, if the target media file is a video-type media file, a video-specific scene recognition algorithm and/or a video-specific person recognition algorithm may be used.

The video-specific scene recognition algorithm takes multi-frame images as input and takes the image scene feature as output. In a pre-training algorithm process, a plurality of groups of third training data may be obtained firstly; each group of third training data includes a first historical video and an image scene feature corresponding to the first historical video; then the multi-frame images of the first historical video are taken as input data, the image scene feature corresponding to the first historical video is taken as output data; and a machine learning algorithm is trained to obtain a video-specific scene recognition algorithm. After inputting the multi-frame images into the above-described video-specific scene recognition algorithm, a matching degree between the content features of the multi-frame images input and the respective image scene features, that is, confidences of the multi-frame images input that correspond to the respective image scene features, may be determined through the calculation within the algorithm. The higher the matching degree between the content features of the multi-frame images input and a certain image scene feature, the higher the confidence corresponding to the image scene feature, and the closer the content features of the multi-frame images input is to the image scene feature. In a process of training the algorithm, an output mode of the algorithm may be set as, for example, only outputting an image scene feature corresponding to the highest confidence, or outputting image scene features corresponding to the top few confidences according to a descending order of confidences. Therefore, after inputting the target media file into the video-specific scene recognition algorithm, the image scene feature (which may be one or more, depending on preset algorithm output) output by the algorithm may be obtained, which is the image scene feature of the target media file; meanwhile, the confidence of the target media file that corresponds to the image scene feature thereof may be obtained through the algorithm used.

The video-specific person recognition algorithm takes multi-frame images as input and takes the image person feature as output. In a pre-training algorithm process, a plurality of groups of fourth training data may be obtained firstly; each group of fourth training data includes a second historical video and an image person feature corresponding to the second historical video; then the multi-frame images of the second historical video are taken as input data, the image person feature corresponding to the second historical video is taken as output data; and a machine learning algorithm is trained to obtain a video-specific person recognition algorithm. After inputting the multi-frame images into the above-described video-specific person recognition algorithm, a matching degree between the content feature of the multi-frame images input and the respective image person features, that is, confidences of the multi-frame images input that correspond to the respective image person features, may be determined through the calculation within the algorithm. The higher the matching degree between the content features of the multi-frame images input and a certain image person feature, the higher the confidence corresponding to the image person feature, and the closer the content features of the multi-frame images input is to the image person feature. In a process of training the algorithm, an output mode of the algorithm may be set as, for example, only outputting an image person feature corresponding to the highest confidence, or outputting image person features corresponding to the top few confidences according to a descending order of confidences. Therefore, after inputting the target media file into the video-specific person recognition algorithm, the image person feature (which may be one or more, depending on preset algorithm output) output by the algorithm may be obtained, which is the image person feature of the target media file; meanwhile, the confidence of the target media file that corresponds to the image person feature thereof may be obtained through the algorithm used.

In another possible implementation mode, if the target media file contains sound content (e.g., the target media file is a video-type media file, and the video media file contains audio), the target media file may be subjected to sound recognition, to obtain a sound feature corresponding to the target media file.

A sound recognition algorithm may be used for sound recognition to obtain the sound feature corresponding to the target media file.

For example, the sound recognition algorithm takes the audio as input and takes the sound feature as output. In a pre-training algorithm process, a plurality of groups of fifth training data may be obtained firstly; each group of fifth training data includes a training audio and a sound feature corresponding to the training audio; then the training audio is taken as input data, the sound feature corresponding to the training audio is taken as output data; and a machine learning algorithm is trained to obtain a sound recognition algorithm. After inputting an audio into the above-described sound recognition algorithm, a matching degree between the content feature of the input audio and the respective sound features, that is, a confidence of the input audio that corresponds to the respective sound features, may be determined through the calculation within the algorithm. The higher the matching degree between the content feature of the input audio and a certain sound feature, the higher the confidence corresponding to the sound feature, and the closer the content feature of the input audio is to the sound feature. In a process of training the algorithm, an output mode of the algorithm may be set as, for example, only outputting a sound feature corresponding to the highest confidence, or outputting sound features corresponding to the top few confidences according to a descending order of confidences. Therefore, after inputting the audio of the target media file into the sound recognition algorithm, the sound feature (which may be one or more, depending on preset algorithm output) output by the algorithm may be obtained, which is the sound feature of the target media file; meanwhile, the confidence of the target media file that corresponds to the sound feature thereof may be obtained through the algorithm used.

In another possible implementation mode, the above-described two modes may also be combined, that is:

Performing image recognition on the target media file to obtain the image scene feature and/or the image person feature corresponding to the target media file; and Performing sound recognition on the target media file to obtain the sound feature corresponding to the target media file.

The specific recognition mode has been given above, and no details will be repeated here.

Figure 2:
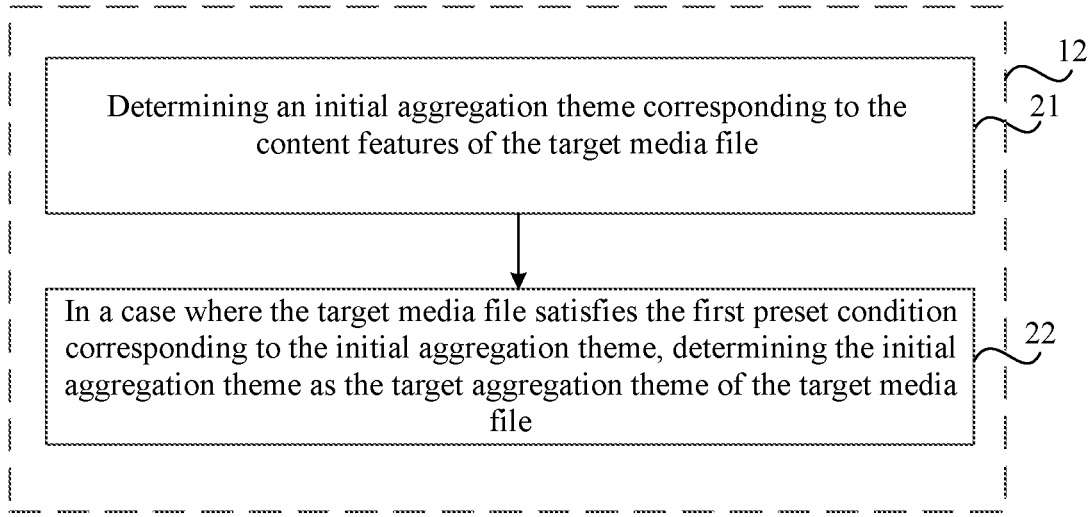
FIG. 2 is an exemplary flow chart of steps of determining a target aggregation theme of a target media file according to recognized content features of the target media file in the media file processing method provided by the present disclosure.

In a possible implementation mode, the determining a target aggregation theme of the target media file according to the recognized content feature of the target media file in step 12 may, as shown in FIG. 2, include steps of:

Step 21: determining an initial aggregation theme corresponding to the content feature of the target media file.

As described above, each aggregation theme may correspond to one content feature or a plurality of content features and may be preset. Therefore, according to the content features of the target media file and the content features corresponding to various aggregation themes, an initial aggregation theme corresponding to the content features of the target media file may be determined.

For example, if the image of the target media file contains water, and the content feature of the target media file corresponds to water, then, if there is an aggregation theme corresponding to the content feature of water, it may be determined that the aggregation theme is the initial aggregation theme corresponding to the target media file.

As described above, the target media file may correspond to one or more content features, and correspondingly, the target media file may correspond to one or more initial aggregation themes. The initial aggregation theme corresponding to the target media file is the aggregation theme under which the target media file may be aggregated.

Step 22: in a case where the target media file satisfies the first preset condition corresponding to the initial aggregation theme, determining the initial aggregation theme as the target aggregation theme of the target media file.

After the initial aggregation theme of the target media file is determined, the target media file may also be screened based on the first preset condition of the initial aggregation theme per se to determine whether the target media file can be finally aggregated under the aggregation theme. For example, if the aggregation theme is "selfie within two months", the aggregation theme corresponds to both a content feature of "selfie" and a first preset condition of "within two months"; so, if the content feature corresponding to the target media file is "selfie", and it is determined that the aggregation theme is the initial aggregation theme of the target media file, thereafter, it is also necessary to judge whether the target media file satisfies the first preset condition of "within two months".

Therefore, the initial aggregation theme corresponding to the target media file corresponds to the first preset condition for determining whether the target media file can be placed in the initial aggregation theme. In a case where the target media file satisfies the first preset condition corresponding to the initial aggregation theme, it means that the target media file can be placed in the initial aggregation theme, so the initial aggregation theme may be determined as the target aggregation theme of the target media file.

As described above, the target media file may correspond to one or more initial aggregation themes. Therefore, in a case where the target media file corresponds to a plurality of initial aggregation themes, the above-described step 22 may be executed with respect to each initial aggregation theme. A first preset condition corresponding to each initial aggregation theme may be consistent. Or, each initial aggregation theme may correspond to its own first preset condition. Moreover, the first preset condition may be flexibly set according to requirements, for example, defined by a user.

In a possible embodiment, it may be determined that the target media file satisfies the first preset condition, in a case where the target media file satisfies at least one of cases below:

A generation time of the target media file is within a preset time period;

A generation location of the target media file is within a preset range; and

An image quality of the target media file is better than a first preset image quality.

The generation time and the generation location of the target media file may be directly obtained from file description information carried by the target media file. For example, if a user uses a terminal to shoot an image, the terminal will automatically record the shooting time and the shooting location of the image when the image shooting is completed, and save the same in the file description information of the image. For another example, if a user uses a terminal to shoot a video, when the video shooting is completed, the terminal will automatically record the shooting time and the shooting location of the video and save the same in the file description information of the video.

The image quality of the target media file may be reflected by an image score. The image score may be determined by an image scoring algorithm; and the image scoring algorithm takes the image as input and takes the image score as output.

For example, the image scoring algorithm takes a single image as input and takes an image score as output. In a pre-training algorithm process, a plurality of groups of sixth training data may be obtained firstly; each group of sixth training data includes a third historical image and an image score corresponding to the third historical image; then the third historical image is taken as input data, the image score corresponding to the third historical image is taken as output data; and a machine learning algorithm is trained to obtain an image scoring algorithm. There are various modes of determining the image score corresponding to the third historical image. For example, the image score may be obtained by manual annotation, or the image score may be obtained based on an existing image scoring method, or the image score may be obtained based on the resolution of the image (the higher the resolution, the higher the score), or the image score may be based on the richness of the image content (the richer the image content and the more elements in the image, the higher the score).

If the target media file is an image-type media file, the image score of the target media file may be obtained directly by using the above-described image scoring algorithm. If the target media file is a video-type media file, the image may be obtained (e.g., all images are obtained, or some images are extracted) from the target media file, and the image score of each frame of the image may be obtained by using the above-described image scoring algorithm. Finally, the image score of the target media file is obtained based on the image score of each frame of the image; for example, a final score of the target media file may be determined based on average, maximum, minimum, and median image scores of each frame of image in the target media file.

In the above-described mode, the content feature of the target media file is used to determine the target aggregation theme of the target media file; since the content feature may be flexibly defined, the aggregation theme of the target media file may be determined more flexibly with a wider application scope.

In a possible implementation mode, the determining the target media file as a media file under the target aggregation theme in step 13 may include steps of:

If there is a first file in the media files under the target aggregation theme, and the image quality of the target media file is better than the image quality of the first file, determining the target media file as a media file under the target aggregation theme, and deleting the first file from the media files under the target aggregation theme;

If there is no first file in the media files under the target aggregation theme, determining the target media file as a media file under the target aggregation theme.

A similarity degree between the content feature of the first file and the content feature of the target media file is greater than a first preset similarity threshold. That is, the first file is a file that is relatively similar to the target image file.

In this case, if the image quality of the target media file is better than the image quality of the first file, it means that the image quality of the target media file is better than similar pictures. Therefore, the target media file may be used to replace the first file under the target aggregation theme to prevent duplicate media files under the same aggregation theme.

However, if there is no first file in the media files under the target aggregation theme, it means that there is no file similar to the target media file in the media files under the target aggregation theme, so the target media file may be directly determined as a media file under the target aggregation theme.

The above-described mode may prevent similar media files from appearing under a same aggregation theme, reduce resource occupation, and ensure better image quality of the media files under the aggregation theme as much as possible.

In addition, if there is a first file in the media files under the target aggregation theme, and the image quality of the first file is better than the image quality of the target media file, it means that there is a file similar to the target media file in the media files under the target aggregation theme; however, the image quality of the image is better than the image quality of the target media file; so the first file may be retained in the target aggregation theme without adding the target media file into the target aggregation theme.

In a possible implementation mode, on a basis of the respective steps of the method shown in FIG. 1, the method provided by the present disclosure may further include steps of:

Displaying the media files under the target aggregation theme in an album corresponding to the target aggregation theme.

Each aggregation theme may correspond to one album, for displaying the media files under the aggregation theme. In addition, the album corresponding to each aggregation theme may also have a cover image. The cover image of the album corresponding to the target aggregation theme will be described in detail below, and a cover image of an album of other aggregation themes may also be understood by referring thereto.

The cover image of the album corresponding to the target aggregation theme is an image contained in the media files under the target aggregation theme. In addition, there may be only one cover image or a plurality of cover images of the album corresponding to the target aggregation theme. If there are a plurality of cover images, there are a plurality of display forms such as randomly displaying one cover image, or arranging and scaling a plurality of cover images before displaying them simultaneously, etc.

When determining the cover image corresponding to the target aggregation theme, all images under the target aggregation theme (including images corresponding to image-type media files and each frame of image of video-type media files) may be firstly extracted; and the cover image is determined from these images. Thus, the cover image of the album corresponding to the target aggregation theme may include images corresponding to image-type media files under the target aggregation theme, and one or more frames of image of video-type media files under the target aggregation theme.

In a possible implementation mode, the cover image may be determined based on image quality of the image, for example, one or more images with higher image quality are taken as the cover image. In a specific implementation, image quality may be obtained by scoring the image; all images under the target aggregation theme may be scored; and one or more images with high image scores are determined as the cover images of the album corresponding to the target aggregation theme. Regardless whether it is an image-type media file or a video-type media file, the images therein may be scored by using the image scoring algorithm given above; and when scoring the video-type media file, each frame of image of the video-type media file may be scored by using the image scoring algorithm to obtain an image score of each frame. The image scoring algorithm has been described above, and no details will be repeated here.

In another possible implementation mode, the cover image corresponding to the target aggregation theme may be determined in a mode below:

Determining, from the media files under the target aggregation theme, first candidate cover images having a matching degree between content features of the first candidate cover images and the content feature corresponding to the target aggregation theme greater than a first preset matching degree threshold;

Sorting the first candidate cover images in a descending order of image quality, and selecting top N images from the first candidate cover images as second candidate cover images;

Determining the cover image corresponding to the target aggregation theme from the second candidate cover images, a similarity degree between the cover image corresponding to the target aggregation theme and other cover images is less than a second preset similarity threshold.

In short, the first candidate cover images with higher "confidence" are determined through the "confidence"; then the second cover images with higher image quality are selected from the first candidate cover images; and then an image that is not similar to any other cover image is selected from the second candidate cover images as the cover image that is determined to be completed.

The matching degree between the content feature and the content feature corresponding to the target aggregation theme may be understood by referring to the matching degree (the confidence) between the content features given when the algorithm is introduced above. Here, the matching degree between the content feature and the content feature corresponding to the target aggregation theme is greater than a second preset matching degree threshold, indicating that the image is close to the content feature of the target aggregation theme and can fully reflect the target aggregation theme. Therefore, the image may be taken as the first candidate cover image.

After the first candidate cover images are determined, the first candidate cover images are sorted in a descending order of image quality, and top N images therein are selected as the second candidate cover images. N is a positive integer greater than or equal to 1. In addition, a level of image quality may be reflected by the score obtained by scoring the image. The specific scoring mode has been described above, and no details will be repeated here.

After the second candidate cover images are determined, a similarity degree between a second candidate cover image and other cover images is determined. Here, the other cover images may include currently determined cover images, for example, cover images of other aggregation themes except the target aggregation theme. If a similarity degree between a certain second candidate cover image and other cover images is greater than or equal to the second preset similarity threshold, it means that there is already an image, which is similar to the image and is to be taken as the cover image; and if the second candidate cover image is still taken as the cover, it may easily lead to cover duplication, resulting in a poor user experience. Therefore, an image, of which similarity degree with other cover images is less than the second preset similarity threshold, is selected from the second candidate cover images, and the image is determined as the cover image corresponding to the target aggregation theme. The step essentially plays a role in "de-duplication".

In addition, with reference to the above, the target aggregation theme may correspond to a variety of content features. Therefore, when calculating the matching degree of the content features, the calculation may be performed on the images of the media files under the target aggregation theme respectively with each content feature of the target aggregation theme, that is, a "confidence" of the image of the media files under the target aggregation theme that corresponds to each content feature of the target aggregation theme is calculated, and first candidate cover images corresponding to each content feature are selected. Thereafter, the first candidate cover images under each content feature are respectively sorted based on image quality, and the second candidate cover images corresponding to each content feature are obtained. Finally, a cover image corresponding to the target aggregation theme is selected from these second candidate cover images. For example, if the target aggregation theme corresponds to M types of content features, then with respect to the M types of content features, M groups of first candidate cover images (each group may have a plurality of first candidate cover images) are respectively determined according to the "confidence"; one image with the highest image quality (at this time, N=1) is selected from each of the M groups to obtain M second candidate cover images; and finally, a cover image that does not overlap with other cover images is selected from the M images according to a similarity degree.

In the above-described mode, the media files under the target aggregation theme are displayed in a form of an album, which is convenient for the user to view, and also facilitates the user to select the media files under the target aggregation theme.

In a possible implementation mode, the synthesizing the media files under the target aggregation theme to obtain a target video corresponding to the target aggregation theme in step 14 may synthesize all of the media files under the target aggregation theme to obtain the target video.

In a possible implementation mode, the target video may be generated based on a screening result after screening the media files under the target aggregation theme to a certain extent. Therefore, the synthesizing the media files under the target aggregation theme to obtain a target video corresponding to the target aggregation theme in step 14 may include steps of:

Determining candidate media files that satisfy a second preset condition in the media files under the target aggregation theme;

Performing video synthesis according to the candidate media files to obtain the target video corresponding to the target aggregation theme.

The second preset condition may be flexibly set as needed. For example, the second preset condition may include at least one of cases below:

An image quality of a second file is better than a second preset image quality;

A resolution of the second file is higher than a preset resolution;

A matching degree between the content feature of the second file and the content feature corresponding to the target aggregation theme is greater than a second preset matching degree threshold.

A comparison between image qualities has been given above, and no details will be repeated here.

The matching degree between the content features of the second file and the content feature corresponding to the target aggregation theme may be understood by referring to the matching degree (confidence) between the content features given when the algorithm is introduced above. Here, the matching degree between the content feature of the second file and the content feature corresponding to the target aggregation theme is greater than the second preset matching degree threshold, indicating that the second file has the content feature close to the content feature of the target aggregation theme and can fully reflect the target aggregation theme, so the second file may be taken as a candidate media file for video synthesis.

The above-described second file is the media file under the target aggregation theme. Since the candidate media file refers to a selected media file, in order to distinguish it from the candidate media file, the second file refers to the media file among the media files under the target aggregation theme that has not been determined as a candidate media file.

In the above-described mode, when performing video synthesis, the media files under the target aggregation theme are screened to a certain extent to form the target video corresponding to the target aggregation theme, which can save the user from manual screening operations, and can improve quality of the target video.

Figure 3:
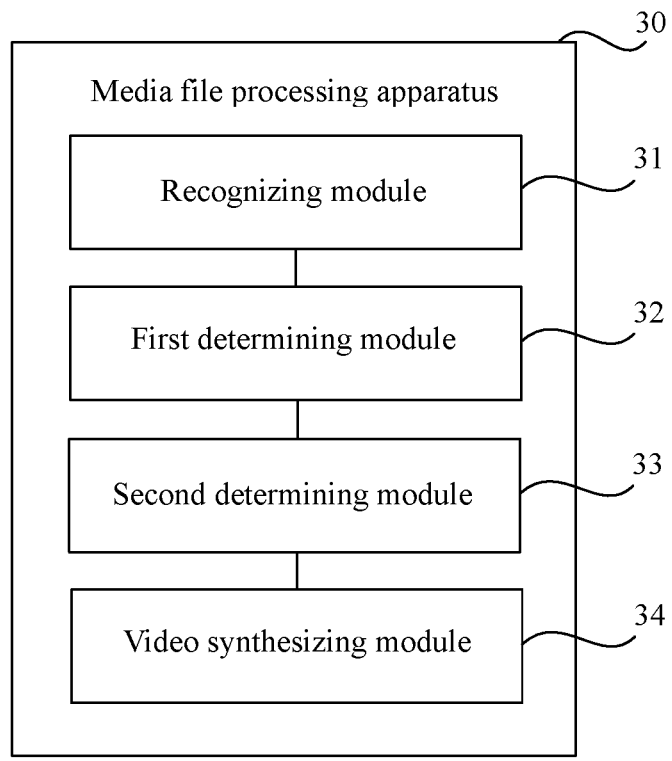
FIG. 3 is a block diagram of a media file processing apparatus provided by an implementation mode of the present disclosure.

FIG. 3 is a block diagram of a media file processing apparatus provided by an embodiment of the present disclosure. As shown in FIG. 3, the apparatus 30 includes:

A recognizing module 31, configured to recognize content features of a target media file, the content features include an image feature and/or a sound feature;

A first determining module 32, configured to determine a target aggregation theme of the target media file according to the recognized content features of the target media file;

A second determining module 33, configured to determine the target media file as the media file under the target aggregation theme; and A video synthesizing module 34, configured to synthesize the media files under the target aggregation theme in response to a video clip instruction with respect to the target aggregation theme, to obtain a target video corresponding to the target aggregation theme.

Optionally, the image features include an image scene feature and/or an image person feature.

Optionally, the first determining module 32 includes:

A first determining sub-module, configured to determine an initial aggregation theme corresponding to the content feature of the target media file;

A second determining sub-module, configured to determine the initial aggregation theme as the target aggregation theme of the target media file, in a case where the target media file satisfies a first preset condition corresponding to the initial aggregation theme.

Optionally, a third determining sub-module determines that the target media file satisfies the first preset condition, in a case where the target media file satisfies at least one of cases below:

A generation time of the target media file is within a preset time period;

A generation location of the target media file is within a preset range; and

An image quality of the target media file is better than a first preset image quality.

Optionally, the second determining module 33 includes:

The third determining sub-module, configured to determine the target media file as a media file under the target aggregation theme, and delete the first file from the media files under the target aggregation theme, if there is a first file, with a similarity degree between the content feature of the first file and the content feature of the target media file being greater than a first preset similarity threshold, among the media files under the target aggregation theme, and an image quality of the target media file is better than image quality of the first file;

A fourth determining sub-module, configured to determine the target media file as the media file under the target aggregation theme, if there is no first file in the media files under the target aggregation theme.

Optionally, the apparatus 30 further includes:

A displaying module, configured to display the media files under the target aggregation theme in an album corresponding to the target aggregation theme;

The cover image of the album corresponding to the target aggregation theme is an image contained in a media file under the target aggregation theme.

Optionally, the cover image corresponding to the target aggregation theme is determined in a mode below:

Determining, from the media files under the target aggregation theme, first candidate cover images having a matching degree between content features of the first candidate cover images and the content feature corresponding to the target aggregation theme being greater than a first preset matching degree threshold;

Sorting the first candidate cover images in a descending order of image quality, and selecting top N images from the first candidate cover images as second candidate cover images; and Determining a cover image corresponding to the target aggregation theme from the second candidate cover images, a similarity degree between the cover image corresponding to the target aggregation theme and another cover image is less than a second preset similarity threshold.

Optionally, the video synthesizing module 34 includes:

A fifth determining sub-module, configured to determine candidate media files that satisfy the second preset condition in the media files under the target aggregation theme;

A synthesizing sub-module, configured to perform video synthesis according to the candidate media files to obtain the target video corresponding to the target aggregation theme.

Optionally, the second preset condition includes at least one of cases below:

An image quality of a second file is better than a second preset image quality;

A resolution of the second file is higher than a preset resolution;

A matching degree between the content feature of the second file and the content feature corresponding to the target aggregation theme is greater than the second preset matching degree threshold;

The second file is of a media file under the target aggregation theme.

With respect to the apparatus according to the above-described embodiment, the specific modes in which the respective modules perform operations have been described in detail in the embodiment of the method, and no details will be repeated here.

Figure 4:
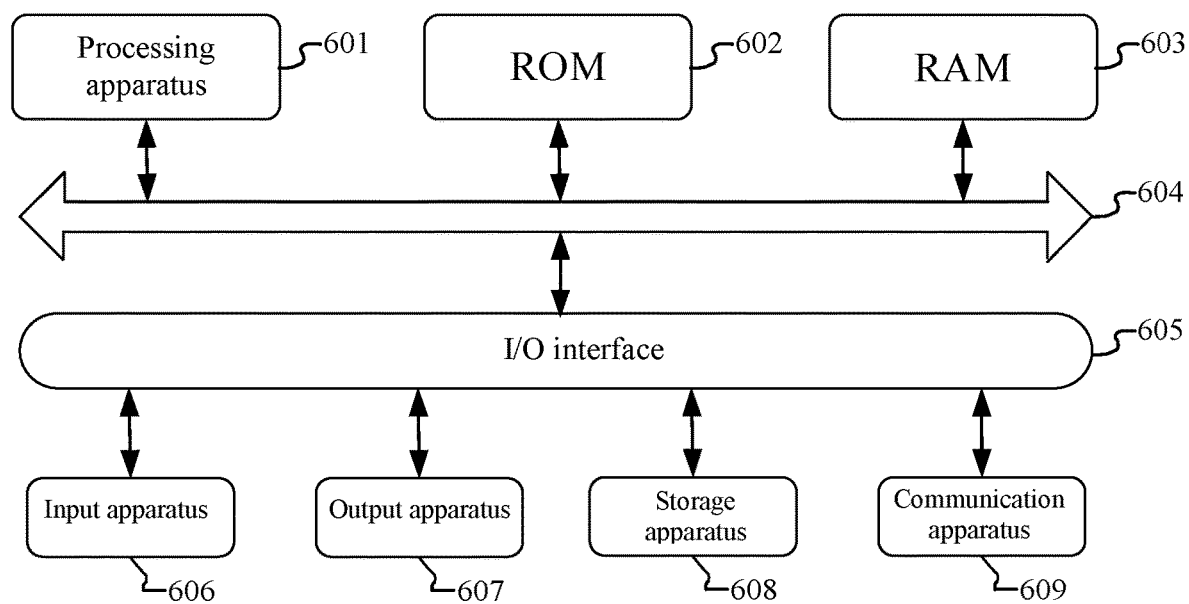
FIG. 4 is an electronic device provided by an exemplary embodiment.

FIG. 4 shows a structural schematic diagram of an electronic device (e.g., a client or a server) suitable for implementing the embodiments of the present disclosure. The terminal device according to the embodiments of the present disclosure may include, but is not limited to, a mobile terminal such as a mobile phone, a laptop, a digital broadcast receiver, a Personal Digital Assistant (PDA), a Portable Android Device (PAD), a Portable Multimedia Player (PMP), a vehicle-mounted terminal (e.g., a vehicle-mounted navigation terminal), etc., and a stationary terminal such as a digital TV, a desktop computer, etc. The terminal device shown in FIG. 4 is only an example, and should not impose any limitation on the function and use scope of the embodiments of the present disclosure.

As shown in FIG. 4, the electronic device 600 may include a processing apparatus (e.g., a central processing unit, a graphics processor, etc.) 601, which may executes various appropriate actions and processing according to a program stored in a Read-Only Memory (ROM) 602 or a program loaded from a storage apparatus 608 into a Random Access Memory (RAM) 603. The RAM 603 further stores various programs and data required for the operation of the electronic device 600. The processing apparatus 601, the ROM 602, and the RAM 603 are connected with each other through a bus 604. An input/output (I/O) interface 605 is also coupled to the bus 604.

Usually, apparatuses below may be coupled to the I/O interface 605: input apparatuses 606 including, for example, a touch screen, a touch pad, a keyboard, a mouse, a camera, a microphone, an accelerometer, a gyroscope, etc.; output apparatuses 607 including, for example, a Liquid Crystal Display (LCD), a speaker, a vibrator, etc.; a storage apparatus 608 including, for example, a magnetic tape, a hard disk, etc.; and a communication apparatus 609. The communication apparatus 609 may allow the electronic device 600 to perform wireless or wired communication with other device so as to exchange data. Although FIG. 4 shows the electronic device 600 having various apparatuses, it should be understood that, it is not required to implement or have all the apparatuses shown, and the electronic device 600 may alternatively implement or have more or fewer apparatuses.

Particularly, according to the embodiments of the present disclosure, the flows as described above with reference to the flow charts may be implemented as computer software programs. For example, the embodiments of the present disclosure include a computer program product, which includes a computer program carried on a computer-readable medium, the computer program containing program codes for executing the method illustrated in the flow chart. In such embodiments, the computer program may be downloaded and installed from the network via the communication apparatus 609, or installed from the storage apparatus 608, or installed from the ROM 602. When executed by the processing apparatus 601, the computer program executes the above-described functions limited in the methods according to the embodiments of the present disclosure.

It should be noted that, in some embodiments of the present disclosure, the above-described computer-readable medium may be a computer-readable signal medium or a computer-readable storage medium, or any combination of the above two. The computer-readable storage medium may be, for example, but not limited to, an electronic, magnetic, optical, electromagnetic, infrared, or semiconductor system, apparatus, or device, or any suitable combination of the above. More specific examples of the computer-readable storage medium may include, but not limited to: an electrical connection having one or more conductors, a portable computer diskette, a hard disk, a random access memory (RAM), a read-only memory (ROM); an erasable programmable read-only memory (EPROM or flash memory); an optical fiber, a portable compact disc read-only memory (CD-ROM); an optical storage apparatus; a magnetic storage apparatus; or any suitable combination of the above. In the present disclosure, the computer-readable storage medium may be any tangible medium that contains or stores a program that may be used by or in conjunction with an instruction executing system, an apparatus, or a device. In the present disclosure, the computer-readable signal medium may include a data signal propagated in baseband or as a portion of a carrier wave, which carries a computer-readable program code therein. Such propagated data signals may take a variety of forms, including but not limited to, electromagnetic signals, optical signals, or any suitable combination of the above. The computer-readable signal medium may also be any computer-readable medium other than a computer-readable storage medium; and the computer-readable signal medium may transmit, propagate, or transport programs for use by or in combination with the instruction executing system, the apparatus, or the device. The program code embodied on the computer-readable medium may be transmitted by using any suitable medium, including, but not limited to, an electrical wire, an optical cable, a radio frequency (RF), etc., or any suitable combination of the above.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-described computer-readable medium may be included in the above-described electronic device, or may also exist alone without being assembled into the electronic device.

The above-described computer-readable medium carries one or more programs, and when the one or more programs are executed by the electronic device, the electronic device is cause to: recognizing content features of a target media file, the content features include an image feature and/or a sound feature; determining a target aggregation theme of the target media file according to the recognized content features of the target media file; determining the target media file as a media file under the target aggregation theme; and synthesizing the media files under the target aggregation theme in response to a video clip instruction with respect to the target aggregation theme, to obtain a target video corresponding to the target aggregation theme.

The computer program codes for executing the operations according to some embodiments of the present disclosure may be written in one or more programming languages or a combination thereof; the above-described programming languages include object-oriented programming languages such as Java, Smalltalk, C++, and also include conventional procedural programming languages such as "C" language or similar programming languages. The program code may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flow chart or block diagrams may represent a module, a program segment, or a portion of codes, which includes one or more executable instructions for implementing specified logical function. It should also be noted that, in some alternative implementations, the functions noted in the block may occur out of the order noted in the accompanying drawings. For example, two blocks shown in succession may, in fact, can be executed substantially concurrently, or the blocks may sometimes be executed in a reverse order, depending upon the functionality involved. It should also be noted that, each block of the block diagrams and/or flow charts, and combinations of blocks in the block diagrams and/or flow charts, may be implemented by special purpose hardware-based systems that execute the specified functions or operations, or may also be implemented by a combination of special purpose hardware and computer instructions.

The modules involved in the embodiments described in this disclosure can be implemented by means of software, or may also be implemented by means of hardware. The name of the module does not constitute the limitation on the module itself under certain circumstances. For example, the recognizing module can also be described as "the module for recognizing content features of a target media file".

The functions described herein above may be executed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of this disclosure, a machine-readable medium can be a tangible medium that can contain or store a program for use by or in connection with an instruction execution system, apparatus or device. The machine-readable medium may be a machine-readable signal medium or a machine-readable storage medium. The machine-readable medium may include, but not limited to, an electronic, magnetic, optical, electromagnetic, infrared, or semiconductor system, apparatus, or device, or any suitable combination of the above. More specific examples of the machine-readable storage medium may include: an electrical connection having one or more conductors, a portable computer diskette, a hard disk, a random access memory (RAM), a read-only memory (ROM); an erasable programmable read-only memory (EPROM or flash memory); an optical fiber, a portable compact disc read-only memory (CD-ROM); an optical storage apparatus; a magnetic storage apparatus; or any suitable combination of the above.

According to one or more embodiments of the present disclosure, a media file processing method is provided. The media file processing method comprises:
  recognizing content features of a target media file, the content features comprise an image feature and/or a sound feature;
  determining a target aggregation theme of the target media file according to the recognized content features of the target media file;
  determining the target media file as media files under the target aggregation theme; and
  synthesizing the media files under the target aggregation theme in response to a video clip instruction with respect to the target aggregation theme, to obtain a target video corresponding to the target aggregation theme.

According to one or more embodiments of the present disclosure, a media file processing method is provided, the image feature comprises an image scene feature and/or an image person feature.

According to one or more embodiments of the present disclosure, a media file processing method is provided, the determining the target aggregation theme of the target media file according to the recognized content features of the target media file, comprises:
  determining an initial aggregation theme corresponding to the content features of the target media file; and
  for each of the initial aggregation theme, determining the initial aggregation theme as the target aggregation theme of the target media file, in a case where the target media file satisfies a first preset condition corresponding to the initial aggregation theme.

According to one or more embodiments of the present disclosure, a media file processing method is provided, the target media file satisfies the first preset condition, in a case where the target media file satisfies at least one of cases below:
  a generation time of the target media file is within a preset time period;
  a generation location of the target media file is within a preset range; and
  an image quality of the target media file is better than a first preset image quality.

According to one or more embodiments of the present disclosure, a media file processing method is provided, the determining the target media file as the media files under the target aggregation theme, comprises:
  in a case where there is a first file, with a similarity degree between a content feature of the first file and the content feature of the target media file being greater than a first preset similarity threshold, among the media files under the target aggregation theme, and an image quality of the target media file is better than an image quality of the first file, determining the target media file as the media files under the target aggregation theme, and deleting the first file from the media files under the target aggregation theme; and
  in a case where the first file is not in the media files under the target aggregation theme, determining the target media file as the media files under the target aggregation theme.

According to one or more embodiments of the present disclosure, a media file processing method is provided, further comprising:
  displaying the media files under the target aggregation theme in an album corresponding to the target aggregation theme;
  a cover image of the album corresponding to the target aggregation theme is an image contained in the media files under the target aggregation theme.

According to one or more embodiments of the present disclosure, a media file processing method is provided, a cover image corresponding to the target aggregation theme is determined in a mode below comprising:
  determining, from the media files under the target aggregation theme, first candidate cover images having matching degrees between content features of the first candidate cover images and the content feature corresponding to the target aggregation theme being greater than a first preset matching degree threshold;

sorting the first candidate cover images in a descending order of image quality, and selecting top N images from the first candidate cover images as second candidate cover images; and determining the cover image corresponding to the target aggregation theme from the second candidate cover images, a similarity degree between the cover image corresponding to the target aggregation theme and another cover image is less than a second preset similarity threshold.

According to one or more embodiments of the present disclosure, a media file processing method is provided, the synthesizing the media files under the target aggregation theme, to obtain the target video corresponding to the target aggregation theme, comprises:

determining candidate media files that satisfy a second preset condition in the media files under the target aggregation theme; and performing video synthesis according to the candidate media files to obtain the target video corresponding to the target aggregation theme.

According to one or more embodiments of the present disclosure, a media file processing method is provided, the second preset condition comprises at least one of cases below:

an image quality of a second file is better than a second preset image quality;

a resolution of the second file is higher than a preset resolution;

a matching degree between the content feature of the second file and the content feature corresponding to the target aggregation theme is greater than a second preset matching degree threshold; and the second file is of the media files under the target aggregation theme.

According to one or more embodiments of the present disclosure, a media file processing apparatus is provided, comprising:

a recognizing module, configured to recognize content features of a target media file, the content features comprise the image feature and/or the sound feature;

a first determining module, configured to determine a target aggregation theme of the target media file according to the recognized content features of the target media file;

a second determining module, configured to determine the target media file as the media files under the target aggregation theme; and a video synthesizing module, configured to synthesize the media files under the target aggregation theme in response to a video clip instruction with respect to the target aggregation theme, to obtain a target video corresponding to the target aggregation theme.

According to one or more embodiments of the present disclosure, a media file processing apparatus is provided, the image feature comprises an image scene feature and/or an image person feature.

According to one or more embodiments of the present disclosure, a media file processing apparatus is provided, the first determining module includes:

a first determining sub-module, configured to determine an initial aggregation theme corresponding to the content feature of the target media file;

a second determining sub-module, configured to determine the initial aggregation theme as the target aggregation theme of the target media file, in a case where the target media file satisfies a first preset condition corresponding to the initial aggregation theme.

According to one or more embodiments of the present disclosure, a media file processing apparatus is provided, a third determining sub-module determines that the target media file satisfies the first preset condition, in a case where the target media file satisfies at least one of cases below:

a generation time of the target media file is within a preset time period;

a generation location of the target media file is within a preset range; and an image quality of the target media file is better than a first preset image quality.

According to one or more embodiments of the present disclosure, a media file processing apparatus is provided, the second determining module includes:

The third determining sub-module, configured to determine the target media file as a media file under the target aggregation theme, and delete the first file from the media files under the target aggregation theme, if there is a first file, with a similarity degree between the content feature of the first file and the content feature of the target media file being greater than a first preset similarity threshold, among the media files under the target aggregation theme, and an image quality of the target media file is better than image quality of the first file;

A fourth determining sub-module, configured to determine the target media file as the media file under the target aggregation theme, if there is no first file in the media files under the target aggregation theme.

According to one or more embodiments of the present disclosure, a media file processing apparatus is provided, the apparatus further includes:

a displaying module, configured to display the media files under the target aggregation theme in an album corresponding to the target aggregation theme;

the cover image of the album corresponding to the target aggregation theme is an image contained in a media file under the target aggregation theme.

According to one or more embodiments of the present disclosure, a media file processing apparatus is provided, the cover image corresponding to the target aggregation theme is determined in a mode below:

determining, from the media files under the target aggregation theme, first candidate cover images having a matching degree between content features of the first candidate cover images and the content feature corresponding to the target aggregation theme being greater than a first preset matching degree threshold;

sorting the first candidate cover images in a descending order of image quality, and selecting top N images from the first candidate cover images as second candidate cover images; and determining a cover image corresponding to the target aggregation theme from the second candidate cover images, a similarity degree between the cover image corresponding to the target aggregation theme and another cover image is less than a second preset similarity threshold.

According to one or more embodiments of the present disclosure, a media file processing apparatus is provided, the video synthesizing module includes:

a fifth determining sub-module, configured to determine candidate media files that satisfy the second preset condition in the media files under the target aggregation theme;

a synthesizing sub-module, configured to perform video synthesis according to the candidate media files to obtain the target video corresponding to the target aggregation theme.

According to one or more embodiments of the present disclosure, a media file processing apparatus is provided, the second preset condition includes at least one of cases below:

an image quality of a second file is better than a second preset image quality;
a resolution of the second file is higher than a preset resolution;
a matching degree between the content feature of the second file and the content feature corresponding to the target aggregation theme is greater than the second preset matching degree threshold;

The second file is of a media file under the target aggregation theme.

The above descriptions are merely some preferred embodiments of the present disclosure and illustrations of the applied technical principles. Those skilled in the art should understand that the scope of the invention involved in the embodiments of the present disclosure is not limited to the technical solution formed by the specific combination of the above-mentioned technical features, and should also cover, without departing from the above-mentioned inventive concept, other technical solutions formed by any combination of the above-mentioned technical features or their equivalent features, for example, the technical solution formed by replacing the above features with the technical features with similar functions disclosed in the embodiments of the present disclosure (but not limited to).

In addition, although operations are depicted in a specific order, it should not be understood as requiring these operations to be executed in the specific order or in a sequential order. Under certain circumstances, multitasking and parallel processing may be beneficial. Similarly, although several specific implementation details are included in the above discussion, these should not be interpreted as limitations on the scope of the present disclosure. Some features described in the context of separate embodiments can also be implemented in a single embodiment in combination. On the contrary, various features described in the context of a single embodiment can also be implemented in various embodiments separately or in any suitable sub-combination.

Although the subject matter has been described in language specific to structural features and/or logical acts of methods, it should be understood that the subject matter defined in the appended claims is not necessarily limited to the specific features or acts described above. On the contrary, the specific features and actions described above are only example forms of realizing the claims. With respect to the apparatus in the above embodiment, the specific mode in which each module executes the operations has been described in detail in the embodiments of the method, and will not be explained in detail here.

What is claimed is:

1. A media file processing method for reducing resource occupation and improving image quality, comprising:
recognizing content features of a target media file by at least one of a first machine learning model or a second machine learning model, wherein the content features comprise at least one of an image feature or a sound feature, wherein the first machine learning model is trained to generate image features based on input images, and wherein the second machine learning model is trained to generate sound features based on input audio;
determining a target aggregation theme corresponding to the target media file based on the recognized content features of the target media file, wherein the target aggregation theme is among a plurality of aggregation themes;
determining whether to place the target media file under the target aggregation theme based at least in part on an image score indicative of an image quality of the target media, wherein the image score is generated by a third machine learning model, wherein the third machine learning model is trained to generate images scores indicative of image qualities corresponding to input images, and wherein the determining whether to place the target media file under the target aggregation theme further comprises:
determining a similarity degree between content features of an existing media file under the target aggregation theme and the recognized content features of the target media file, and
replacing the existing media file with the target media file based on the similar degree and comparing the image quality of the target media with an image quality of the existing media file so as to reduce resource occupation and ensure image qualities of media files under the target aggregation theme; and
synthesizing the media files under the target aggregation theme in response to a video clip instruction with respect to the target aggregation theme to obtain a target video corresponding to the target aggregation theme.

2. The method according to claim 1, wherein the image feature comprises an image scene feature and/or an image person feature.

3. The method according to claim 1, further comprises:
determining an initial aggregation theme corresponding to the content features of the target media file; and
determining the initial aggregation theme as the target aggregation theme of the target media file in response to determining that the target media file satisfies a first preset condition corresponding to the initial aggregation theme.

4. The method according to claim 1, wherein, further comprises:
determining a generation time of the target media file is within a preset time period;
determining a generation location of the target media file is within a preset range.

5. The method according to claim 1, further comprises:
determining that the similarity degree between the content features of the existing media file and the recognized content features of the target media file is greater than a first preset similarity threshold;
determining that the image quality of the target media file is better than the image quality of the existing media file; and
deleting the existing media file from the media files under the target aggregation theme and placing the target media file under the target aggregation theme.

6. The method according to claim 1, further comprising:
displaying the media files under the target aggregation theme in an album corresponding to the target aggregation theme.

7. The method according to claim 6, wherein a cover image of the album corresponding to the target aggregation theme is an image contained in the media files under the target aggregation theme.

8. The method according to claim 6, wherein a cover image corresponding to the target aggregation theme is determined in a mode below comprising:
- determining, from the media files under the target aggregation theme, first candidate cover images having matching degrees between content features of the first candidate cover images and the content feature corresponding to the target aggregation theme being greater than a first preset matching degree threshold;
- sorting the first candidate cover images in a descending order of image quality, and selecting top N images from the first candidate cover images as second candidate cover images; and
- determining the cover image corresponding to the target aggregation theme from the second candidate cover images, wherein a similarity degree between the cover image corresponding to the target aggregation theme and another cover image is less than a second preset similarity threshold.

9. The method according to claim 1, wherein, the synthesizing the media files under the target aggregation theme, to obtain the target video corresponding to the target aggregation theme, comprises:
- determining candidate media files that satisfy a second preset condition in the media files under the target aggregation theme; and
- performing video synthesis according to the candidate media files to obtain the target video corresponding to the target aggregation theme.

10. The method according to claim 9, wherein the second preset condition comprises at least one of cases below:
- an image quality of a second file is better than a second preset image quality;
- a resolution of the second file is higher than a preset resolution;
- a matching degree between the content feature of the second file and the content feature corresponding to the target aggregation theme is greater than a second preset matching degree threshold; and
- the second file is of the media files under the target aggregation theme.

11. A non-transitory computer-readable medium, on which a computer program is stored, wherein, when executed by a processing apparatus, the computer program causes the processing apparatus to implements operations comprising:
- recognizing content features of a target media file by at least one of a first machine learning model or a second machine learning model, wherein the content features comprise at least one of an image feature or a sound feature, wherein the first machine learning model is trained to generate image features based on input images, and wherein the second machine learning model is trained to generate sound features based on input audio;
- determining a target aggregation theme corresponding to the target media file based on the recognized content features of the target media file, wherein the target aggregation theme is among a plurality of aggregation themes;
- determining whether to place the target media file under the target aggregation theme based at least in part on an image score indicative of an image quality of the target media, wherein the image score is generated by a third machine learning model, wherein the third machine learning model is trained to generate images scores indicative of image qualities corresponding to input images, and wherein the determining whether to place the target media file under the target aggregation theme further comprises:
  - determining a similarity degree between content features of an existing media file under the target aggregation theme and the recognized content features of the target media file, and
  - replacing the existing media file with the target media file based on the similar degree and comparing the image quality of the target media with an image quality of the existing media file so as to reduce resource occupation and ensure image qualities of media files under the target aggregation theme; and
- synthesizing the media files under the target aggregation theme in response to a video clip instruction with respect to the target aggregation theme to obtain a target video corresponding to the target aggregation theme.

12. An electronic device, comprising:
- a storage apparatus, on which a computer program is stored; and
- a processing apparatus, configured to execute the computer program in the storage apparatus, to implement operations comprising:
- recognizing content features of a target media file by at least one of a first machine learning model or a second machine learning model, wherein the content features comprise at least one of an image feature or a sound feature, wherein the first machine learning model is trained to generate image features based on input images, and wherein the second machine learning model is trained to generate sound features based on input audio;
- determining a target aggregation theme corresponding to the target media file based on the recognized content features of the target media file, wherein the target aggregation theme is among a plurality of aggregation themes;
- determining whether to place the target media file under the target aggregation theme based at least in part on an image score indicative of an image quality of the target media, wherein the image score is generated by a third machine learning model, wherein the third machine learning model is trained to generate images scores indicative of image qualities corresponding to input images, and wherein the determining whether to place the target media file under the target aggregation theme further comprises:
  - determining a similarity degree between content features of an existing media file under the target aggregation theme and the recognized content features of the target media file, and
  - replacing the existing media file with the target media file based on the similar degree and comparing the image quality of the target media with an image quality of the existing media file so as to reduce resource occupation and ensure image qualities of media files under the target aggregation theme; and
- synthesizing the media files under the target aggregation theme in response to a video clip instruction with respect to the target aggregation theme to obtain a target video corresponding to the target aggregation theme.

* * * * *